United States Patent
Weizman et al.

(10) Patent No.: US 10,887,326 B2
(45) Date of Patent: Jan. 5, 2021

(54) DISTRIBUTED SYSTEM FOR ADAPTIVE PROTECTION AGAINST WEB-SERVICE-TARGETED VULNERABILITY SCANNERS

(71) Applicant: Microsoft Technology Licensing, LLC, Redmond, WA (US)

(72) Inventors: Josef Weizman, Haifa (IL); Tomer Koren, Tel Aviv (IL); Ram Haim Pliskin, Rishon LeZion (IL); Hani Hana Neuvirth, Redmond, WA (US); Dotan Patrich, Rishon LeZion (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 305 days.

(21) Appl. No.: 15/941,593

(22) Filed: Mar. 30, 2018

(65) Prior Publication Data
US 2019/0306178 A1  Oct. 3, 2019

(51) Int. Cl.
*H04L 29/06* (2006.01)
*G06K 9/62* (2006.01)
(Continued)

(52) U.S. Cl.
CPC ........ *H04L 63/1416* (2013.01); *G06F 21/552* (2013.01); *G06F 21/566* (2013.01);
(Continued)

(58) Field of Classification Search
CPC ............ H04L 63/1416; H04L 63/0227; H04L 63/1433; H04L 63/1441; H04L 63/145;
(Continued)

(56) References Cited

U.S. PATENT DOCUMENTS

| 8,544,087 B1 | 9/2013 | Eskin et al. |
| 8,752,183 B1 * | 6/2014 | Heiderich ............. G06F 21/577 726/22 |

(Continued)

FOREIGN PATENT DOCUMENTS

| CN | 106790256 A | 5/2017 |
| EP | 2916256 A1 | 9/2015 |

OTHER PUBLICATIONS

Reddy, Saveen et al.; Azure Data Lake Analytics; Microsoft; Jun. 23, 2017; 195 pages.

(Continued)

*Primary Examiner* — Ali S Abyaneh
*Assistant Examiner* — Zoha Piyadehghibi Tafaghodi
(74) *Attorney, Agent, or Firm* — Workman Nydegger

(57) ABSTRACT

A method includes obtaining a dictionary, data for a set of web requests, and definitions of a first set of clusters associated with vulnerability scanners. The method includes identifying a set of clients that transmitted the second set of web requests. The method includes generating a second set of feature vectors, which each corresponds to one of the clients. Each element in each feature vector corresponds respectively to an entry in the dictionary. The method includes clustering the second set of feature vectors into a second set of clusters. The method includes, in response to a first distance between a selected cluster of the second set of clusters and one of the first set of clusters being less than a first predetermined distance, (i) identifying one of the set of web services that received web requests corresponding to feature vectors in the selected cluster and (ii) generating a scanning alert.

20 Claims, 11 Drawing Sheets

(51) Int. Cl.
  *G06F 21/55* (2013.01)
  *G06F 21/56* (2013.01)
  *H04L 29/08* (2006.01)

(52) U.S. Cl.
  CPC ......... *G06K 9/6218* (2013.01); *G06K 9/6228* (2013.01); *G06K 9/6255* (2013.01); *G06K 9/6272* (2013.01); *H04L 63/0227* (2013.01); *H04L 63/145* (2013.01); *H04L 63/1433* (2013.01); *H04L 63/1441* (2013.01); *H04L 67/02* (2013.01)

(58) Field of Classification Search
  CPC ..... H04L 67/02; G06F 21/552; G06F 21/566; G06K 9/6218; G06K 9/6228; G06K 9/6255; G06K 9/6272
  See application file for complete search history.

(56) References Cited

U.S. PATENT DOCUMENTS

| | | | |
|---|---|---|---|
| 2005/0044406 A1* | 2/2005 | Stute | C12Q 1/6804 726/4 |
| 2009/0157419 A1* | 6/2009 | Bursey | H04W 4/70 705/346 |
| 2010/0005061 A1* | 1/2010 | Basco | G06F 16/355 704/9 |
| 2011/0214157 A1 | 9/2011 | Korsunsky et al. | |
| 2013/0086688 A1* | 4/2013 | Patel | G06F 21/53 726/25 |
| 2013/0191919 A1* | 7/2013 | Basavapatna | G06F 21/577 726/25 |
| 2013/0247205 A1* | 9/2013 | Schrecker | G06F 21/577 726/25 |
| 2016/0021141 A1* | 1/2016 | Liu | H04L 63/1433 726/23 |
| 2016/0352772 A1 | 12/2016 | O'connor | |
| 2017/0063889 A1* | 3/2017 | Muddu | G06K 9/2063 |

OTHER PUBLICATIONS

"International Search Report and Written Opinion Issued in PCT Application No. PCT/US19/022378", dated May 24, 2019, 11 Pages. (MS#403807-WO-PCT).

* cited by examiner

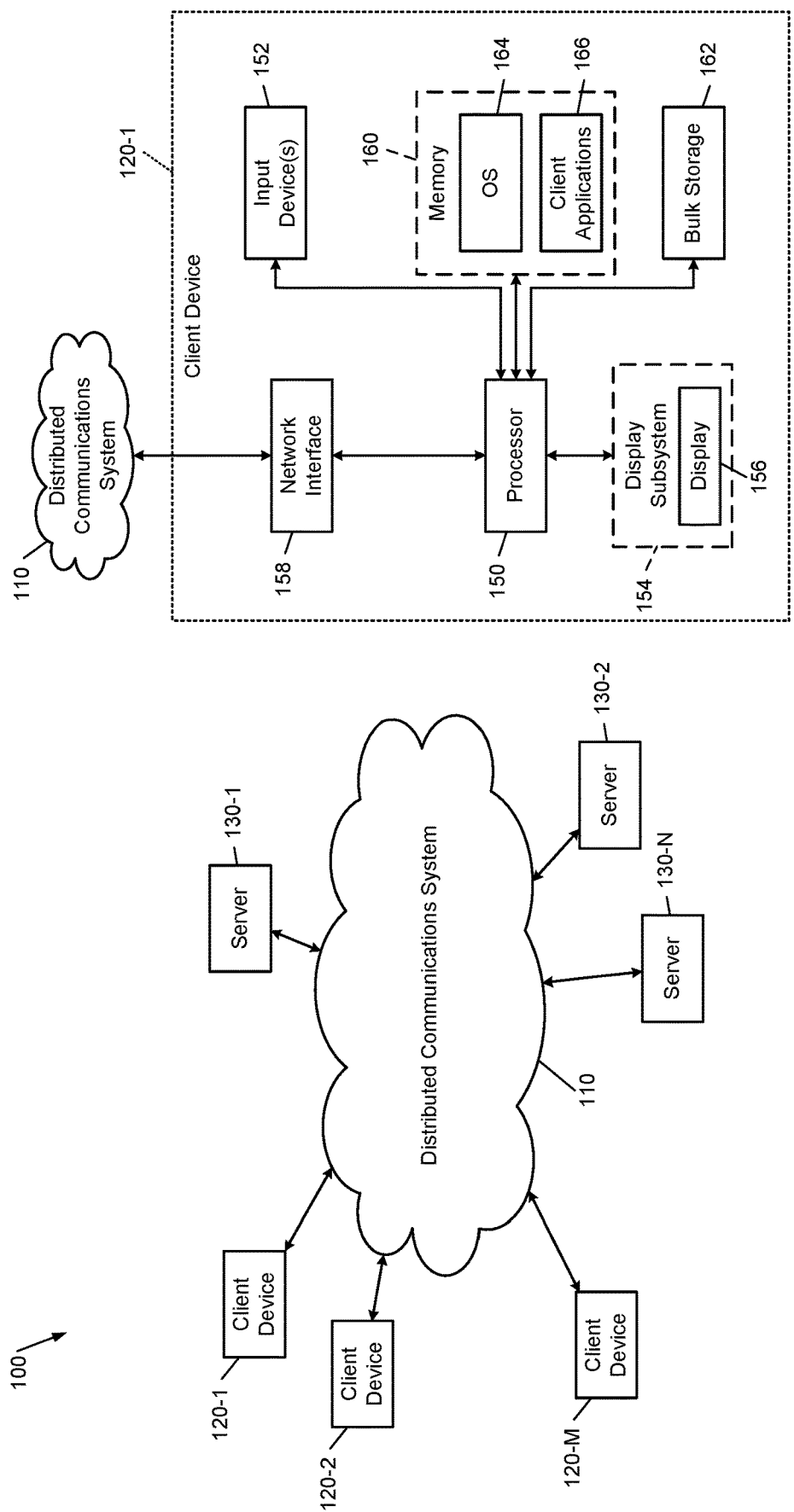

DISTRIBUTED SYSTEM FOR ADAPTIVE PROTECTION AGAINST WEB-SERVICE-TARGETED VULNERABILITY SCANNERS

FIELD

The present disclosure relates to information security and more particularly to protecting publicly-facing web services against vulnerability scanning.

BACKGROUND

Publicly-facing web services, including web applications, generally accept connections from anywhere on the Internet. While this provides high availability for customers or clients, it also means that malicious actors are able to connect to the web service. Because of the complexity of a web service stack—including an operating system, a web server, custom code or plugins, and perhaps a hypervisor—the web service may have one or more known or unknown vulnerabilities.

A malicious actor may employ a vulnerability scanner that transmits a series of requests to the web service to probe for vulnerabilities. In the event that the web service has not updated every component of its software stack, known vulnerabilities may be found. Further, vulnerabilities may exist for which fixes are not yet available or may never be available. Once a malicious actor identifies a vulnerability, the malicious actor may exploit the vulnerability to cause any number of harms to the interests of the administrator of the web service and its legitimate clients. These harms include, for example, denial of service, corruption of data, defacing of the web service, exfiltration of data, lateral compromise of other systems, and injection of malicious code.

There are a number of known vulnerability scanners, such as the open-source Wfuzz vulnerability scanner, the open-source Nikto vulnerability scanner, the open-source Firebug browser extension, the Metasploit penetration testing framework, the SHODAN search engine, etc. A system administrator may therefore attempt to configure their web service to identify signatures of these known vulnerability scanners and prevent the web service from responding to the known vulnerability scanners. However, this approach requires substantial manual effort and is brittle, failing to account for new variations or generations of vulnerability scanners.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes at least one processor and a computer-readable medium configured to store instructions for execution by the at least one processor. The instructions include obtaining a dictionary and definitions of a first set of clusters associated with a plurality of vulnerability scanners. The instructions include receiving data for a second set of web requests transmitted to a set of web services. The instructions include identifying a set of clients that transmitted the second set of web requests. The instructions include generating a second set of feature vectors. For each feature vector in the second set of feature vectors, the feature vector corresponds to one of the set of web services and to one of the set of clients and each element in the feature vector corresponds respectively to an entry in the dictionary. The instructions include clustering the second set of feature vectors into a second set of clusters. The instructions include, in response to a first distance between a selected cluster of the second set of clusters and one of the first set of clusters being less than a first predetermined distance, (i) identifying one of the set of web services that received web requests corresponding to feature vectors in the selected cluster and (ii) generating an alert for an administrator of the one of the set of web services.

In other features, the instructions include obtaining a first set of web requests associated with the plurality of vulnerability scanners. The instructions include identifying patterns from the first set of web requests. Each of the patterns includes information from at least one of the first set of web requests. The instructions include creating the dictionary based on the identified patterns. The instructions include generating a first set of feature vectors. For each feature vector in the first set of feature vectors, the feature vector corresponds to one of the plurality of vulnerability scanners and each element in the feature vector corresponds respectively to an entry in the dictionary. The instructions include clustering the first set of feature vectors into the first set of clusters.

In other features, the instructions include dividing the identified patterns into non-overlapping first and second subsets. Patterns in the first subset are more frequent in the first set of web requests than are patterns of the second subset. The dictionary is created from the first subset exclusive of the second subset. In other features, the first set of web requests are hypertext transfer protocol (HTTP) requests. Each of the HTTP requests is associated with an Internet Protocol (IP) address, a user agent string, and a path. Each of the identified patterns includes a uniform resource identifier (URI) from each of at least one of the HTTP requests.

In other features, for each pattern of the identified patterns, the pattern includes a uniform resource identifier (URI) from a respective plurality of the first set of web requests. A time interval between an earliest one of the respective plurality of the first set of web requests and a latest one of the respective plurality of the first set of web requests is less than a predetermined time interval. In other features, the instructions include, in response to the first distance being greater than the first predetermined distance but less than a second predetermined distance, (i) adding the selected cluster to the second set of clusters and (ii) generating an alert for the administrator.

In other features, the instructions include, in response to the first distance being greater than the second predetermined distance but less than a third predetermined distance, (i) proposing addition of the selected cluster to the second set of clusters and (ii) selectively generating an alert for the administrator. The instructions include, in response to analyst input that the selected cluster represents vulnerability scanning activity, adding the selected cluster to the second set of clusters.

In other features, the instructions include, in response to the first distance being less than the first predetermined distance, selectively updating the one of the first set of clusters to encompass the selected cluster. In other features, the first distance is determined based on cosine similarity between a centroid of the selected cluster and a centroid of the one of the first set of clusters. In other features, the one of the first set of clusters is chosen such that the first distance is less than or equal to respective distances between the selected cluster and remaining ones of the first set of clusters.

In other features, the second set of web requests are hypertext transfer protocol (HTTP) requests. Each of the HTTP requests is associated with an Internet Protocol (IP) address, a user agent string, and a path. Each of the set of clients is associated with a unique combination of IP address and user agent string. In other features, the instructions include, in response to a request from the administrator, sending a command to a packet filter to transmit an alert when a packet stream targeted at the one of the set of web services matches a signature that is based on the first set of clusters. In other features, the instructions include, in response to a request from the administrator, sending a command to the packet filter to temporarily blacklist a sender when the packet stream matches the signature.

A method includes obtaining a dictionary and definitions of a first set of clusters associated with a plurality of vulnerability scanners. The method includes receiving data for a second set of web requests transmitted to a set of web services. The method includes identifying a set of clients that transmitted the second set of web requests. The method includes generating a second set of feature vectors. For each feature vector in the second set of feature vectors, the feature vector corresponds to one of the set of web services and to one of the set of clients and each element in the feature vector corresponds respectively to an entry in the dictionary. The method includes clustering the second set of feature vectors into a second set of clusters. The method includes, in response to a first distance between a selected cluster of the second set of clusters and one of the first set of clusters being less than a first predetermined distance, (i) identifying one of the set of web services that received web requests corresponding to feature vectors in the selected cluster and (ii) generating a scanning alert for an administrator of the one of the set of web services.

In other features, the method includes obtaining a first set of web requests associated with the plurality of vulnerability scanners. The method includes identifying patterns from the first set of web requests. Each of the patterns includes information from at least one of the first set of web requests. The method includes creating the dictionary based on the identified patterns. The method includes generating a first set of feature vectors. For each feature vector in the first set of feature vectors, the feature vector corresponds to one of the plurality of vulnerability scanners and each element in the feature vector corresponds respectively to an entry in the dictionary. The method includes clustering the first set of feature vectors into the first set of clusters.

In other features, the method includes dividing the identified patterns into non-overlapping first and second subsets. Patterns in the first subset are more frequent in the first set of web requests than are patterns of the second subset. The dictionary is created from the first subset exclusive of the second subset. In other features, the first set of web requests are hypertext transfer protocol (HTTP) requests. The second set of web requests are HTTP requests. Each of the HTTP requests is associated with an Internet Protocol (IP) address, a user agent string, and a path. Each of the identified patterns includes a uniform resource identifier (URI) from each of at least one of the HTTP requests. Each of the set of clients is associated with a unique combination of IP address and user agent string.

In other features, for each pattern of the identified patterns, the pattern includes a uniform resource identifier (URI) from a respective plurality of the first set of web requests and a time interval between an earliest one of the respective plurality of the first set of web requests and a latest one of the respective plurality of the first set of web requests is less than a predetermined time interval.

In other features, the first distance is determined based on cosine similarity between a centroid of the selected cluster and a centroid of the one of the first set of clusters. The method includes, in response to the first distance being less than the first predetermined distance, selectively updating the one of the first set of clusters to encompass the selected cluster. The method includes, in response to the first distance being greater than the first predetermined distance but less than a second predetermined distance, (i) adding the selected cluster to the second set of clusters and (ii) generating a scanning alert for the administrator. The method includes, in response to the first distance being greater than the second predetermined distance but less than a third predetermined distance, (i) proposing addition of the selected cluster to the second set of clusters and (ii) selectively generating a scanning alert for the administrator, and (iii) in response to analyst input that the selected cluster represents vulnerability scanning activity, adding the selected cluster to the second set of clusters.

A computer-readable medium stores processor-executable instructions including obtaining a dictionary and definitions of a first set of clusters associated with a plurality of vulnerability scanners. The instructions include receiving data for a second set of web requests transmitted to a set of web services. The instructions include identifying a set of clients that transmitted the second set of web requests. The instructions include generating a second set of feature vectors. For each feature vector in the second set of feature vectors, the feature vector corresponds to one of the set of web services and to one of the set of clients and each element in the feature vector corresponds respectively to an entry in the dictionary. The instructions include clustering the second set of feature vectors into a second set of clusters. The instructions include, in response to a first distance between a selected cluster of the second set of clusters and one of the first set of clusters being less than a first predetermined distance, (i) identifying one of the set of web services that received web requests corresponding to feature vectors in the selected cluster and (ii) generating a vulnerability scanning alert for an administrator of the one of the set of web services.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 1 is a simplified block diagram of an environment in which the principles of the present disclosure can be implemented.

FIG. 2 is a functional block diagram of an example implementation of a client device.

In the drawings, reference numbers may be reused to identify similar and/or identical elements.

DETAILED DESCRIPTION

Introduction

Figure 3:
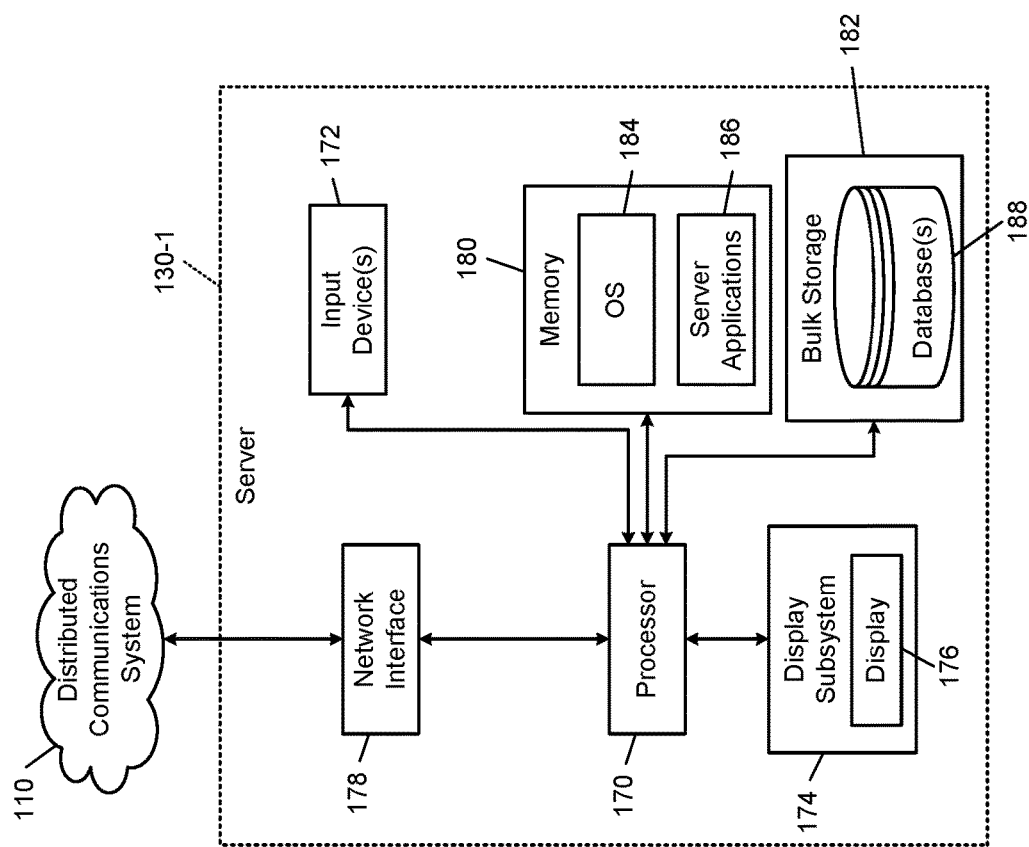
FIG. 3 is a functional block diagram of an example implementation of a server.

Once activity from a vulnerability scanner has been identified, that activity can be used to create a signature for the vulnerability scanner. That signature can then be used to detect future operation of instances of that vulnerability scanner. However, as the vulnerability scanner is updated, forked, or intentionally obfuscated, detecting operation of the vulnerability scanner becomes much more difficult. While skilled system administrators may be able to review logs to identify vulnerability scanning activity, less experienced system administrators or businesses without dedicated system administrators may be unable to detect modified vulnerability scanning behavior.

The present disclosure therefore describes a technological approach to automating what previously required human expertise: characterizing vulnerability scanner activity and creating signatures for the vulnerability scanning activity. Further, the present disclosure describes adaptively updating those signatures as the vulnerability scanning behavior changes. The present disclosure may allow for real-time (that is, within seconds) notification of web service administrators regarding vulnerability scanning. In other implementations, notification follows a capture interval (such as one hour, two hours, or 24 hours). In addition, based on the vulnerability scanner signatures, vulnerability scanning traffic may be proactively blocked by a packet filter.

Vulnerability scanning behavior may be characterized by sets of hypertext transfer protocol (HTTP) requests. For example, certain pairs, triplets, etc. of HTTP requests may be indicative of a certain vulnerability scanner. When these groups of requests are seen, the activity can be attributed to the vulnerability scanner. To evaluate traffic, then, groups of N requests are formed from the traffic.

N-groups of HTTP requests may be formed by taking all of the HTTP requests from a certain sender within a specified time interval and looking at each combination of N requests from the collected requests. For example, that time interval could be 10 seconds, 30 seconds, or one minute. For example, in a case where N=3 (the N-group is a triplet) and 20 requests have been received within a defined time interval, the N-groups used for evaluation are each of the 1140 combinations of 3 requests chosen from the 20 requests. Each of the N-groups of requests is called a pattern.

To establish an initial dictionary, the activity of multiple known vulnerability scanners is analyzed. Specifically, the HTTP requests transmitted by the vulnerability scanners are analyzed. The logs for known vulnerability scanners may be limited to only vulnerability scanner traffic or may more broadly contain everything from certain known bad IP addresses.

Every group of N HTTP requests transmitted within a certain time interval is identified as a feature. In addition, features may include groups of P requests (P is different than N) and Q requests (Q is different than P and N). For example, 2-groups, 3-groups, and 4-groups could all be identified as features. For simplicity of explanation, the remainder of the disclosure describes features as being groups of two requests.

Once the features have been determined for the known vulnerability scanners, the frequency of the features is analyzed. Those features that are more common are added to a dictionary, while the rarer features are excluded from the dictionary. The frequency of features is determined across the set of known vulnerability scanners and across the set of web services being monitored so that malicious activity, which should have lower variation than legitimate user activity, will stand out. The malicious activity is not only repeated by multiple instances of a scanning platform but is also repeated against multiple targets, leading to higher frequencies of related features.

Once the feature dictionary is produced, a vector is determined for each vulnerability scanner. The vector has an element for every entry in the dictionary. The element may be binary, indicating whether the dictionary pattern occurred in the vulnerability scanner traffic, or may be numeric indicating how many times the dictionary pattern occurred in the vulnerability scanner traffic. The feature vectors for all of the vulnerability scanners can then be analyzed by a clustering mechanism, such as k-means clustering. These clusters of feature vectors then characterize vulnerability scanner activity.

Once clusters of known vulnerability scanner activity are determined, logs of HTTP requests can be analyzed for similarity to the known vulnerability scanner activity. For example, HTTP requests received by multiple web services can be analyzed and, for each client (defined by IP address and user agent) exchange with a web service, a feature vector is determined. The client-service feature vector includes an element for each entry in the dictionary, indicating whether or how many times that feature was present in the traffic sent by the client to the web service.

All of these feature vectors are then clustered and the resulting clusters are compared to the known vulnerability scanner clusters. In the case that a detected cluster overlaps with a vulnerability scanner cluster, this is an indication that the vulnerability scanner was active and the system administrator for the corresponding web service can be notified. If a cluster of observed traffic is close to a cluster of a known vulnerability scanner, this new cluster may be considered an evolution or variation of the vulnerability scanner and added to the set of vulnerability scanner clusters. The system administrator is again notified that vulnerability scanning activity has occurred. Meanwhile, clusters that are further away may require review by a security analyst (referred to as an operator below) to determine whether they are in fact variations of a vulnerability scanner or benign traffic. Finally, clusters of observed traffic at a greater distance from clusters of known vulnerability scanners are ignored as regular traffic.

Environment

Below are simplistic examples of a distributed computing environment in which the systems and methods of the present disclosure can be implemented. Throughout the description, references to terms such as servers, client devices, applications and so on are for illustrative purposes only. The terms server and client device are to be understood broadly as representing computing devices with one or more processors and memory configured to execute machine readable instructions. The terms application and computer program are to be understood broadly as representing machine readable instructions executable by the computing devices.

FIG. 1 shows a simplified example of a distributed computing system 100. The distributed computing system 100 includes a distributed communications system 110, one or more client devices 120-1, 120-2, . . . , and 120-M (collectively, client devices 120), and one or more servers 130-1, 130-2, . . . , and 130-N (collectively, servers 130). M and N are integers greater than or equal to one. The distributed communications system 110 may include a local area network (LAN), a wide area network (WAN) such as the Internet, or other type of network. The client devices 120 and the servers 130 may be located at different geographical locations and communicate with each other via the distributed communications system 110. The client devices 120 and the servers 130 connect to the distributed communications system 110 using wireless and/or wired connections.

The client devices 120 may include smartphones, personal digital assistants (PDAs), tablets, laptop computers, personal computers (PCs), etc. The servers 130 may provide multiple services to the client devices 120. For example, the servers 130 may execute software applications developed by one or more vendors. The servers 130 may host multiple databases that are relied on by the software applications in providing services to users of the client devices 120.

The client devices 120 are able to connect to a web service; however, there is no guarantee that all of the client devices 120 are legitimate users. Instead, one or more of the client devices 120 may be executing a vulnerability scanner application. The servers 130 may individually or collectively implement systems according to the present disclosure. For example, the server 130-1 may operate a web service, while the server 130-2 may operate a firewall protecting the web service executing on the server 130-1. The server 130-N may implement an analysis engine to identify vulnerability scanning activity directed at the server 130-1.

FIG. 2 shows a simplified example of the client device 120-1. The client device 120-1 may typically include a central processing unit (CPU) or processor 150, one or more input devices 152 (e.g., a keypad, touchpad, mouse, touchscreen, etc.), a display subsystem 154 including a display 156, a network interface 158, memory 160, and bulk storage 162.

The network interface 158 connects the client device 120-1 to the distributed computing system 100 via the distributed communications system 110. For example, the network interface 158 may include a wired interface (for example, an Ethernet interface) and/or a wireless interface (for example, a Wi-Fi, Bluetooth, near field communication (NFC), or other wireless interface). The memory 160 may include volatile or nonvolatile memory, cache, or other type of memory. The bulk storage 162 may include flash memory, a magnetic hard disk drive (HDD), and other bulk storage devices.

The processor 150 of the client device 120-1 executes an operating system (OS) 164 and one or more client applications 166. The client applications 166 include an application that accesses the servers 130 via the distributed communications system 110.

FIG. 3 shows a simplified example of the server 130-1. The server 130-1 typically includes one or more CPUs or processors 170, a network interface 178, memory 180, and bulk storage 182. In some implementations, the server 130-1 may be a general-purpose server and include one or more input devices 172 (e.g., a keypad, touchpad, mouse, and so on) and a display subsystem 174 including a display 176.

The network interface 178 connects the server 130-1 to the distributed communications system 110. For example, the network interface 178 may include a wired interface (e.g., an Ethernet interface) and/or a wireless interface (e.g., a Wi-Fi, Bluetooth, near field communication (NFC), or other wireless interface). The memory 180 may include volatile or nonvolatile memory, cache, or other type of memory. The bulk storage 182 may include flash memory, one or more magnetic hard disk drives (HDDs), or other bulk storage devices.

The processor 170 of the server 130-1 executes an operating system (OS) 184 and one or more server applications 186, which may be housed in a virtual machine hypervisor or containerized architecture. The bulk storage 182 may store one or more databases 188 that store data structures used by the server applications 186 to perform respective functions.

Block Diagrams

Figure 4:
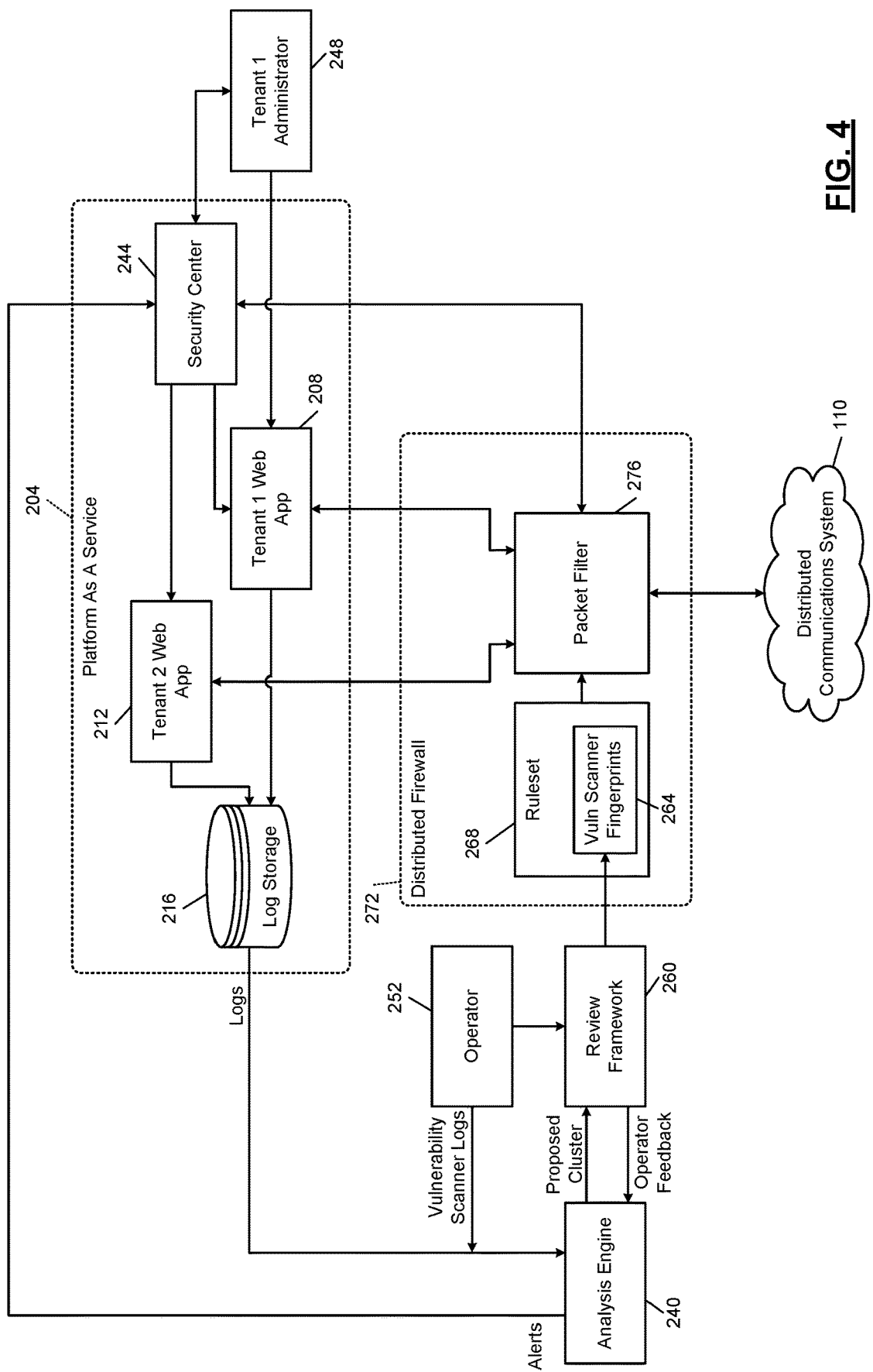
FIG. 4 is a functional block diagram of an example implementation of the principles of the present disclosure.

In FIG. 4, a platform as a service 204 implements a first web application (app) 208 for a first tenant and a second web app 212 for a second tenant. The platform as a service 204 may be a distributed computing system including numerous compute, networking, and storage resources. As an example only, the platform as a service 204 may be the Azure web hosting platform from Microsoft Corp. While described in this figure as a platform as a service, the principles of the present disclosure apply to any web services or apps, whether hosted on premises, in rented facilities, or in a hosted environment. Further, the principles of the present disclosure apply to web services running directly on native operating systems, hypervisors, containers, etc.

As the web apps 208 and 212 operate, log files are generated and stored into log storage 216. While shown as a unitary block, the log storage 216 may be physically or logically separate for the web apps 208 and 212 and may be distributed across multiple storage resources and even across multiple geographic regions. As two examples, the logs stored by the log storage 216 may take the form of text files or database entries.

An analysis engine 240 periodically retrieves logs from the log storage 216 and analyzes the logs for vulnerability scanner activity. Identified vulnerability scanner activity is alerted to a security center 244. The security center 244 may transmit an alert to a corresponding system administrator. The alert may take the form of an email, a text message, an app notification, or any other communication framework, such as the Slack messaging system from Slack Technologies. Additionally or alternatively, the security center 244 may retain the alert for display to a system administrator upon accessing the security center 244, such as through a web portal.

As an example, an administrator of the first tenant is represented schematically at 248. The administrator 248 manages the first web app 208 and communicates with the security center 244 to establish security policies for the first web app 208 as well as to monitor alerts, such as warnings of vulnerability scanning activity directed at the first web app 208. The security center 244 may also provide administrator 248 with suggestions for remediation. For example, the security center 244 may indicate to the administrator 248 that certain modules of the first web app 208 need to be upgraded. In addition, the security center 244 may suggest blocking certain ports or certain uniform resource identifiers (URIs) to decrease the exposure of the first web app 208.

An operator (also called a security analyst) 252 associated with the analysis engine 240 provides vulnerability scanner activity logs to the analysis engine 240. These logs are used by the analysis engine 240 to determine clusters of vulnerability scanner activity. The operator 252 may refer to a person, a role, or a team related to security analysis.

The analysis engine 240 may identify a cluster of activity that is close to existing vulnerability scanner activity but not close enough to be confident of such a determination. The analysis engine 240 may therefore propose the cluster to a review framework 260. The operator 252 can then, via the review framework 260, determine whether the proposed cluster is associated with vulnerability scanning behavior or is benign activity.

Determinations made by the operator 252 are provided to the analysis engine 240 by the review framework 260. If the proposed cluster does not represent vulnerability scanner activity, the analysis engine 240 may discard the proposed cluster. The review framework 260 may also allow the operator 252 to identify vulnerability scanner fingerprints 264 that form part of a ruleset 268 in a distributed firewall 272. The distributed firewall 272 intercepts traffic between the distributed communications system 110 and the web apps 208 and 212.

A packet filter 276 of the distributed firewall 272 may make decisions about where to route packets and whether to drop certain packets based on the ruleset 268. For example, when certain packets match the vulnerability scanner fingerprints 264 of the ruleset 268, the packet filter 276 may drop those packets or may transmit an alert to the security center 244. When the web apps 208 and 212 communicate using HTTP Secure (HTTPS), the packet filter may securely store private keys from the web apps 208 and 212 in order to access encrypted HTTP headers. In a more secure implementation, the packet filter 276 may act as an HTTPS proxy, where the web apps 208 and 212 are configured to trust the certificate of the packet filter 276. The packet filter 276 can then present its certificate to clients, analyzing traffic and then re-encrypting the data for transmission to the web apps 208 and 212.

Figure 5:
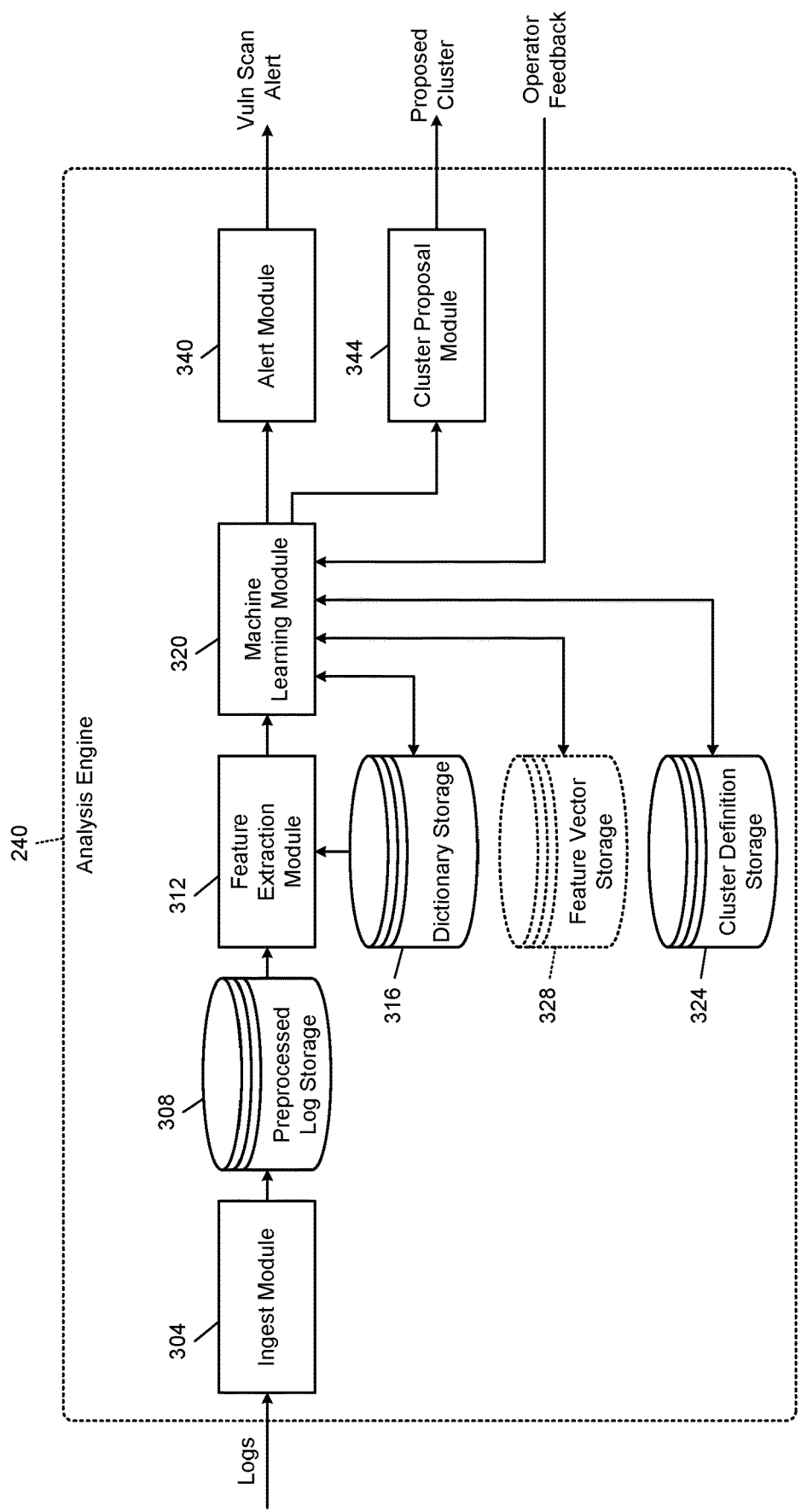
FIG. 5 is a functional block diagram of an example implementation of an analysis engine according to the principles of the present disclosure.

In FIG. 5, an example implementation of the analysis engine 240 includes an ingest module 304 that receives logs from the log storage 216 of FIG. 4. The ingest module 304 may apply processing to the logs and store the preprocessed logs into storage 308. For example, the ingest module 304 may take logs from different sources in different formats, and potentially having different schemas, and perform extract, transform, load (ETL) operations to harmonize the logs into a single schema.

In addition, the ingest module 304 may perform some amount of filtering or normalization. For example, user agent strings may be normalized to reduce the ability of a vulnerability scanner to avoid detection by simply fuzzing the user agent string. In addition, the ingest module 304 may discard portions of the path in the HTTP request to allow for more uniform comparisons of HTTP requests. In other words, the uniform resource identifier (URI) associated with an HTTP request may be a subset of the path contained in the HTTP request. The subset may not always be a proper subset.

As an example, consider multiple web apps hosted at the same domain, with the web apps being distinguished by the first portion of the path. Without removing that first portion from the path, two identical requests going to two different web apps at the same domain will have different paths. In such cases, the ingest module 304 may excise the portion of the path indicating the web app so that the resulting URIs will match. In other implementations, the ingest module 304 may excise everything prior to the final forward slash of the path.

A feature extraction module 312 identifies features of the logged traffic for each client of each web service. The client may be defined by the combination of source Internet Protocol (IP) address and user agent string. Dictionary storage 316 defines features of interest, which form elements of the feature vector for the client-service traffic.

A machine learning module 320 may use supervised or unsupervised learning to identify traffic indicative of vulnerability scanning. For example, the machine learning module 320 may be trained with known vulnerability scanning traffic as well as known benign traffic. In the disclosure below, the machine learning module 320 is described as being implemented by unsupervised classification. First, as described in more detail below, the machine learning module 320 is provided with known vulnerability scanner activity. The machine learning module 320 defines a dictionary relevant to features of the known vulnerability scanner activity and stores the dictionary entries into dictionary storage 316.

The machine learning module 320 uses the dictionary entries to determine feature vectors of vulnerability scanners and clusters the feature vectors to store definitions of vulnerability scanner clusters into cluster definition storage 324. Further, the machine learning module 320 may store the feature vectors into feature vector storage 328 for future clustering analyses. While the cluster definition storage 324 maintains information about the clusters of vulnerability scanner activity, the actual vulnerability scanner activity of individual vulnerability scanners may be maintained by the feature vector storage 328.

The feature vector storage 328 may include its own dictionary entries, as the dictionary entries in the dictionary storage 316 may vary over time. For example, while the dictionary storage 316 may include the most frequent features of vulnerability scanners, the feature vector storage 328 may store more or all of the feature vectors of vulnerability scanners. In this way, over time, certain features may cumulatively become more prominent and may then merit inclusion in the dictionary storage 316.

Once the machine learning module 320 has stored the cluster definitions of vulnerability scanners into the cluster definition storage 324, the machine learning module 320 can evaluate new feature vectors to determine whether they cluster with the known vulnerability scanner cluster definitions from the cluster definition storage 324.

The machine learning module 320 activates an alert module 340 in response to identifying clusters of activity that match clusters of vulnerability scanner activity. When the machine learning module 320 identifies a cluster of activity that is similar to known vulnerability scanner activity, this cluster may be provided as a proposed cluster by a cluster proposal module 344 for evaluation by the operator 252 of FIG. 4. Operator feedback is received by the machine learning module 320. If the operator identifies a proposed cluster as representing vulnerability scanner activity, the machine learning module 320 stores definitional information about that cluster (such as a centroid of the cluster) into cluster definition storage 324.

Flowcharts

Figure 6A:
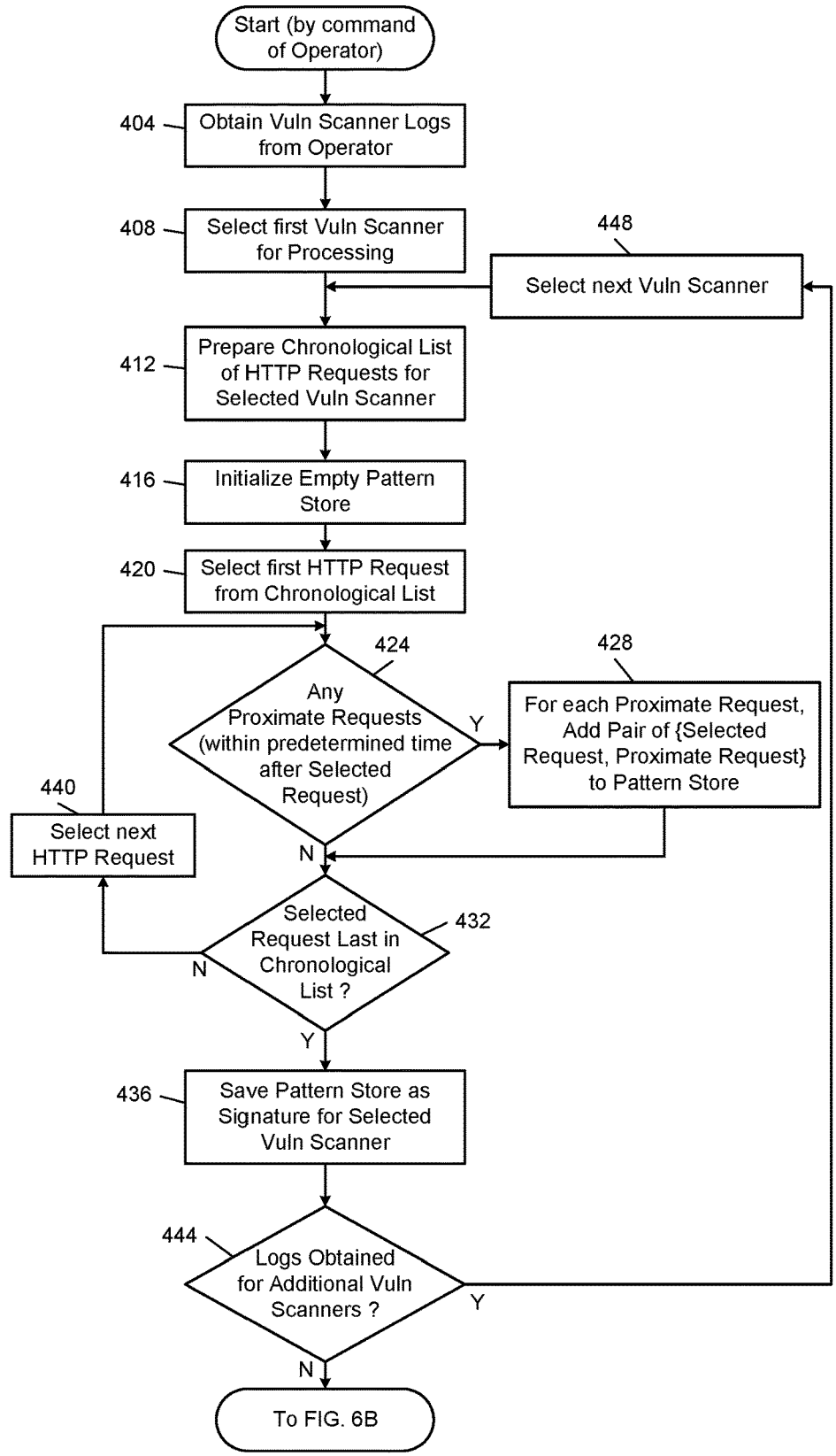
FIGS. 6A-6C together form a flowchart of example operation of generating a dictionary and set of feature vector clusters for vulnerability scanners.
Figure 6B:
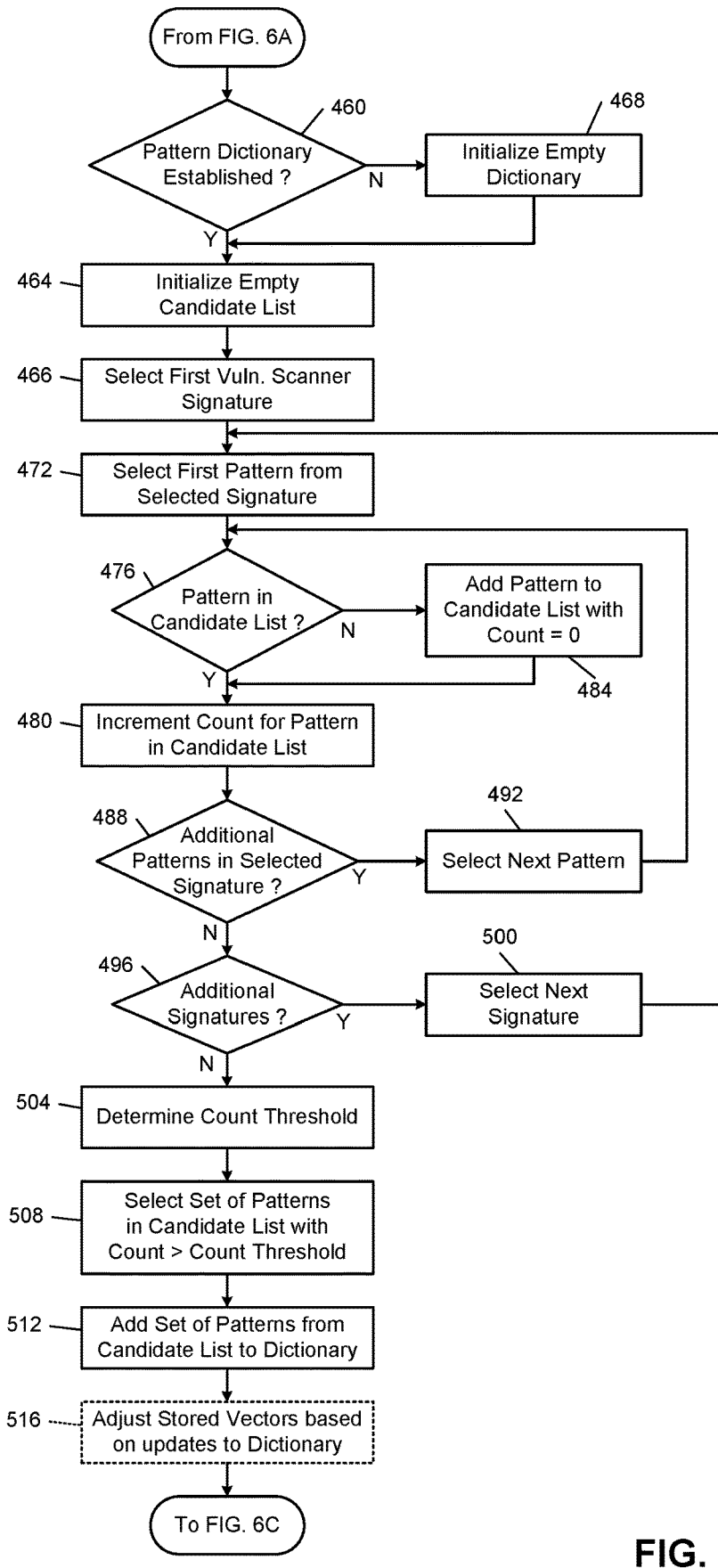
Figure 6C:
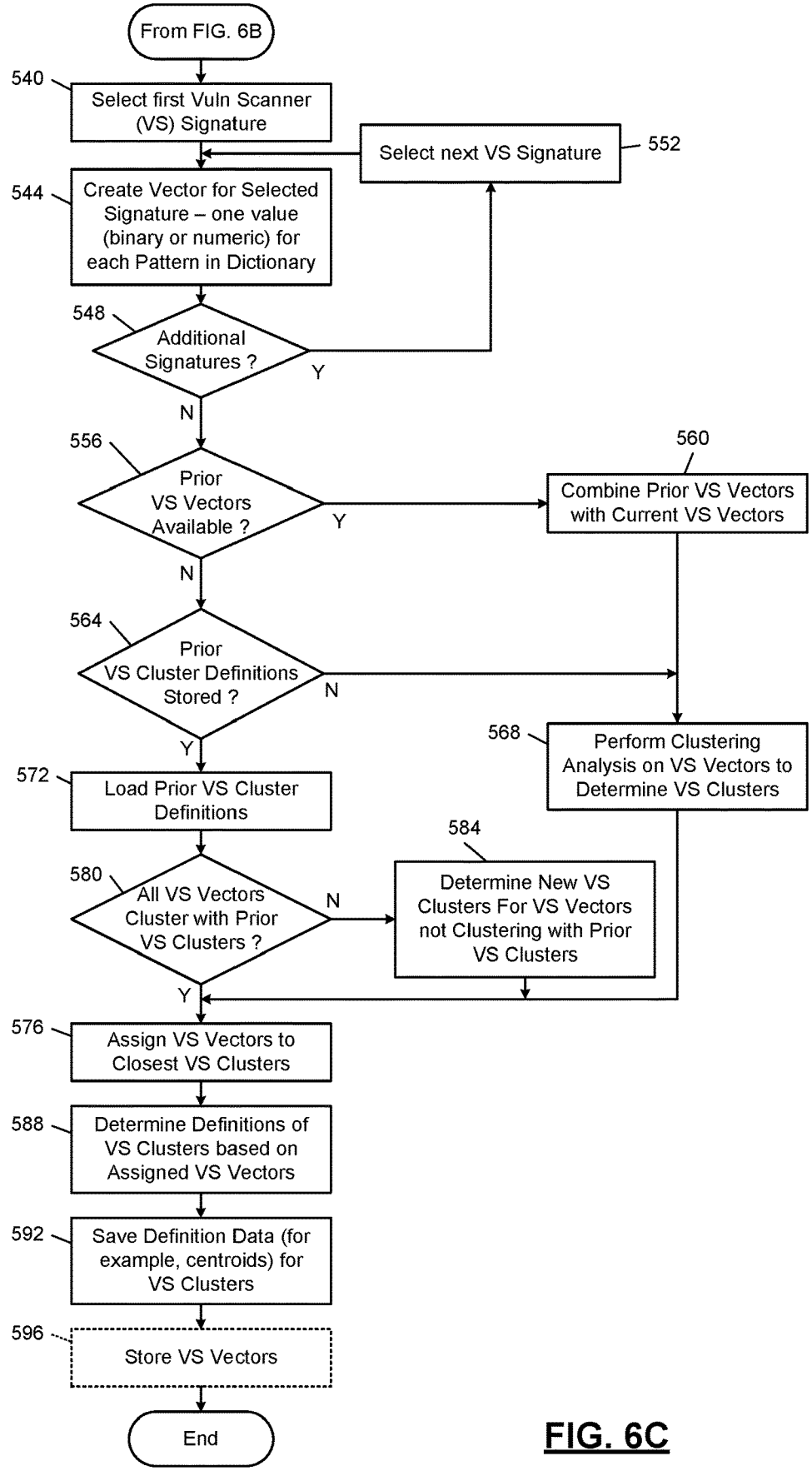

In FIGS. 6A-6C, cluster definitions for known vulnerability scanner activity are determined. The analysis below is described for illustration only using explicit loops and nested loops. Actual implementations may, for efficiency, execute much of the analysis in parallel, such as by using a distributed computation system. For example only, a map-reduce framework may be used to parse HTTP logs and create feature vectors. In another example, U-SQL queries may be used to perform the analysis.

In FIG. 6A, control begins by command of an operator at 404, where control obtains vulnerability scanner logs from the operator. At 408, control selects the first vulnerability scanner from the logs for processing. At 412, control prepares a chronological list of HTTP requests made by the selected vulnerability scanner. At 416, control initializes an empty pattern store. At 420, control selects the first HTTP request from the chronological list. At 424, control determines whether there are any HTTP requests proximate to the selected HTTP request. If so, control transfers to 428; otherwise, control transfers to 432. A proximate request is an HTTP request that is received within a predetermined window of time after the selected request.

At 428, for each of the HTTP requests qualifying as a proximate request, control adds the pair of the selected request and the proximate request as a pattern to the pattern store. The pattern may be formed from a uniform resource identifier (URI) of the selected request and a URI of the proximate request. For example only, the URI of the selected request may be some or all of a path contained in the selected request while the URI of the proximate request may be some or all of a path contained in the proximate request. Control then continues at 432.

At 432, control determines whether the selected request is the last in the chronological list of HTTP requests. If so, control transfers to 436; otherwise, control transfers to 440. At 440, control selects the next HTTP request and returns to 424. At 436, control saves the pattern store as the signature for the selected vulnerability scanner. At 444, control determines whether logs were obtained for additional vulnerability scanners. If so, control transfers to 448; otherwise, control transfers to 460 in FIG. 6B. At 448, control selects the next vulnerability scanner and returns to 412.

At 460 in FIG. 6B, control determines whether a pattern dictionary has been established. If so, control continues at 464; otherwise, control transfers to 468. At 468, control initializes an empty dictionary and continues at 464. At 464, control initializes a candidate list for candidate patterns for potential addition to the dictionary. At 466, control selects the first vulnerability scanner signature. At 472, control selects the first pattern from the selected signature. At 476, control determines whether the pattern is in the candidate list. If so, control transfers to 480; otherwise, control transfers to 484.

At 476, the pattern may be compared to the candidate list preserving order (as a permutation) or irrespective of order (as a combination). For example, a group of two requests may be considered the same pattern regardless of which order the requests were made. In other implementations, the order may be considered. When the pattern is added to the candidate list in 484, if order is irrelevant the pattern may be structured so that the order of the requests in the pattern is sorted according to a predetermined rubric. For example, the requests may simply be sorted alphabetically. When order matters, the pattern may be sorted chronologically or reverse chronologically.

At 484, control adds the pattern to the candidate list and sets a metadata value, count, associated with the candidate list entry to 0. Control then continues at 480. At 480, control increments the count value for the pattern in the candidate list. At 488, control determines whether there are additional patterns in the selected signature. If so, control transfers to 492; otherwise, control transfers to 496. At 492, control selects the next pattern in the selected signature and returns to 476. At 496, if there are additional signatures for further vulnerability scanners, control transfers to 500; otherwise, control transfers to 504. At 500, control selects the next signature for further vulnerability scanners and returns to 472.

At 504, control determines a count threshold. This establishes which patterns in the dictionary will be added to the dictionary and which are too infrequent to retain. For example, the count threshold may be a fixed number or may be determined as a percentage of the highest count, in either the dictionary or the candidate list. In other implementations, the count threshold may be a count that is one or more standard deviations below the mean of the counts in the dictionary. In other implementations, the count threshold may be determined such that a fixed number of patterns are stored in the dictionary. In other words, the count threshold may be set to limit the dictionary to a certain number (such as 10,000) of the most common patterns. In yet another implementation, the count threshold may be set so that a certain percentage (such as 50%) of the patterns in the candidate list are added to the dictionary. In other implementations, the count threshold may be set at a percentage, such as 50%, of the median value of counts in the dictionary.

At 508, control selects the set of patterns in the candidate list whose count is greater than the count threshold. The selected set is a subset of the set of patterns, which may not necessarily be a proper subset and which may be the empty set. At 512, the selected set of patterns is added to the dictionary. In various implementations, patterns in the candidate list that are already present in the dictionary may be removed from the candidate list; the counts for those patterns may be added to the counts in the dictionary. In various implementations, patterns in the candidate list that were already present in the dictionary may be removed before determining the count threshold at 504.

At 516, control adjusts stored vectors based on updates to the dictionary. For example, when new entries are added to the dictionary, zero-valued elements are added to vectors that did not previously have elements corresponding to the new dictionary entries. In some implementations, patterns may be deleted from the dictionary, such as when the patterns have not been observed for a predetermined period of time, or when the rate of observation has been below a threshold for the predetermined period of time. When a vector includes entries for a dictionary entry that has been deleted, those elements of the vector are also deleted. In various implementations, the control at 516 may be omitted, such as when vectors are not individually retained in storage.

Control continues at 540 in FIG. 6C, where control selects the first vulnerability scanner signature. At 544, control creates a vector for the selected signature. The vector has one value (binary or numeric) for each pattern in the dictionary. This vector may be determined by parsing the pattern store for the selected vulnerability scanner. Various techniques for increasing efficiency may be implemented, such as creating the vector for the selected signature while the patterns are being identified from the HTTP requests of the vulnerability scanner. Then, the vector can be adjusted based on changes to the dictionary and parsing through the pattern store again may be avoided.

At 548, control determines whether there are additional vulnerability scanner signatures. If so, control transfers to 552; otherwise, control transfers to 556. At 552, control selects the next vulnerability scanner signature and returns to 544. At 556, control determines whether there are prior vulnerability scanner vectors available. If so, control transfers to 560; otherwise, control transfers to 564. At 560, control combines the prior vulnerability scanner vectors with the currently determined vulnerability scanner vectors from 544. Control then continues at 568. At 564, control determines whether vulnerability scanner cluster definitions have been previously stored. If so, control transfers to 572; otherwise, control transfers to 568.

At 568, control performs a clustering analysis on the vectors to determine vulnerability scanner clusters. For example, the clustering analysis may use k-means clustering. Control then continues at 576. At 572, control loads the prior vulnerability scanner cluster definitions. At 580, control determines whether all of the vulnerability scanner vectors cluster with prior vulnerability scanner clusters. If so, control transfers to 576; otherwise, control transfers to 584. At 584, control determines new vulnerability scanner clusters for vulnerability scanner vectors that do not cluster with the prior vulnerability scanner clusters. Control then continues at 576.

At 576, control assigns each of the vulnerability scanner vectors to the respective closest vulnerability scanner cluster. The closeness of a vector to a cluster may be determined using cosine similarity between the vector and a centroid of the cluster. At 588, control determines definitions of the vulnerability scanner clusters based on the assigned vulnerability scanner vectors. For example, this may include identifying a centroid of each cluster. At 592, control saves the definition data for the vulnerability scanner clusters. At 596, control optionally stores the vulnerability scanner vectors for future re-clustering analysis. Control then ends.

Figure 7A:
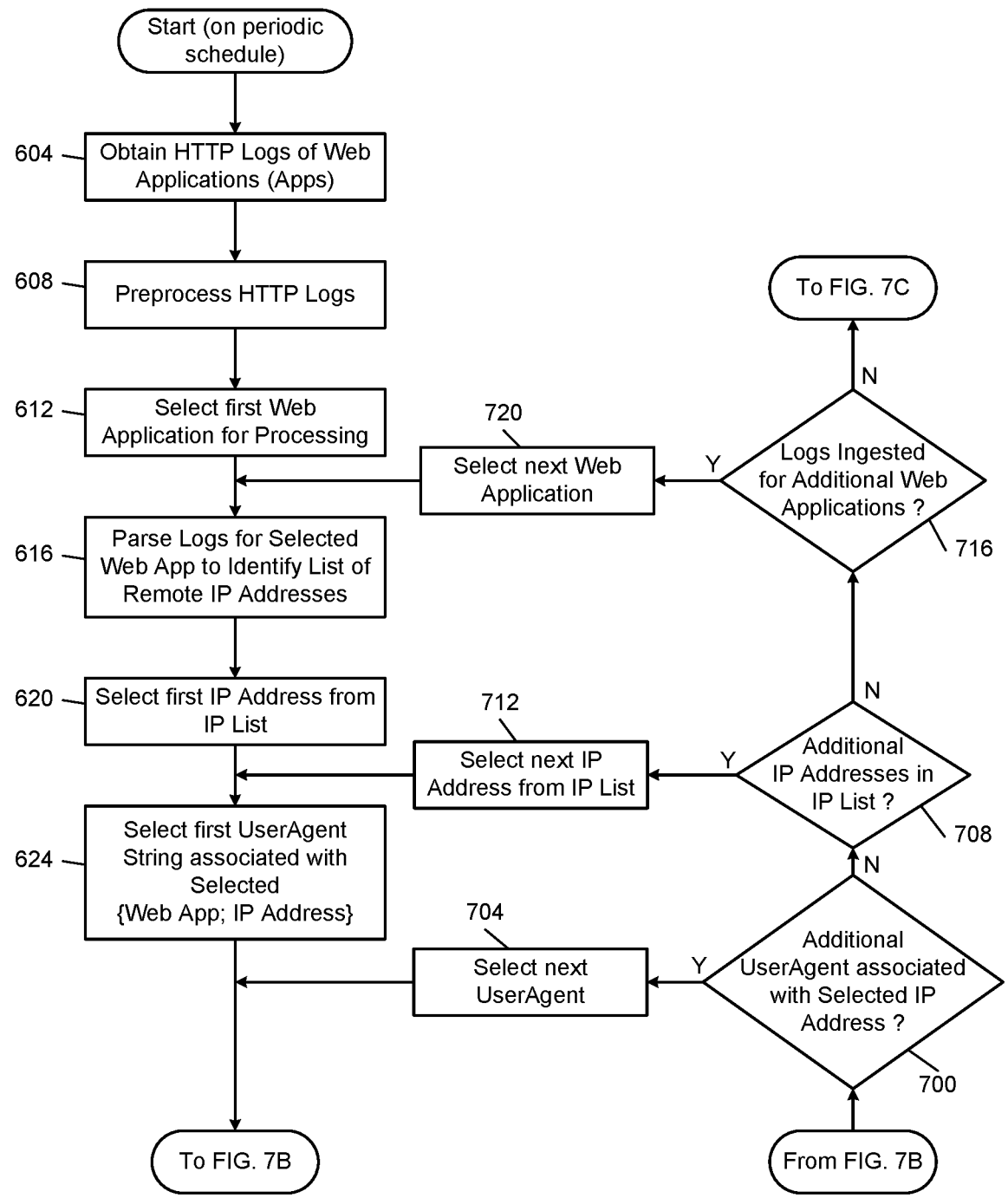
FIGS. 7A-7C together form a flowchart depicting example operation of comparing web traffic to the known vulnerability scanner feature vector clusters.
Figure 7B:
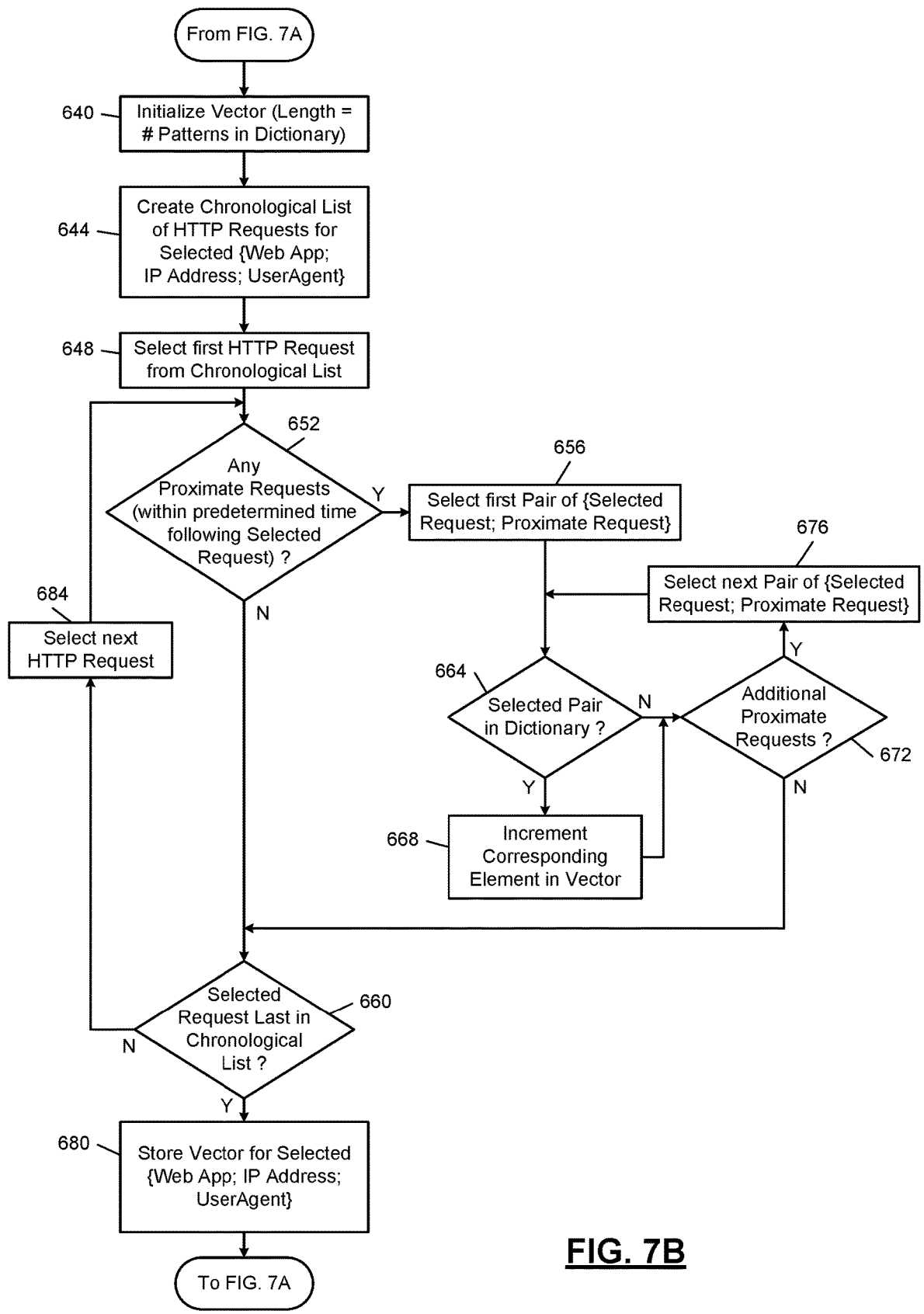
Figure 7C:
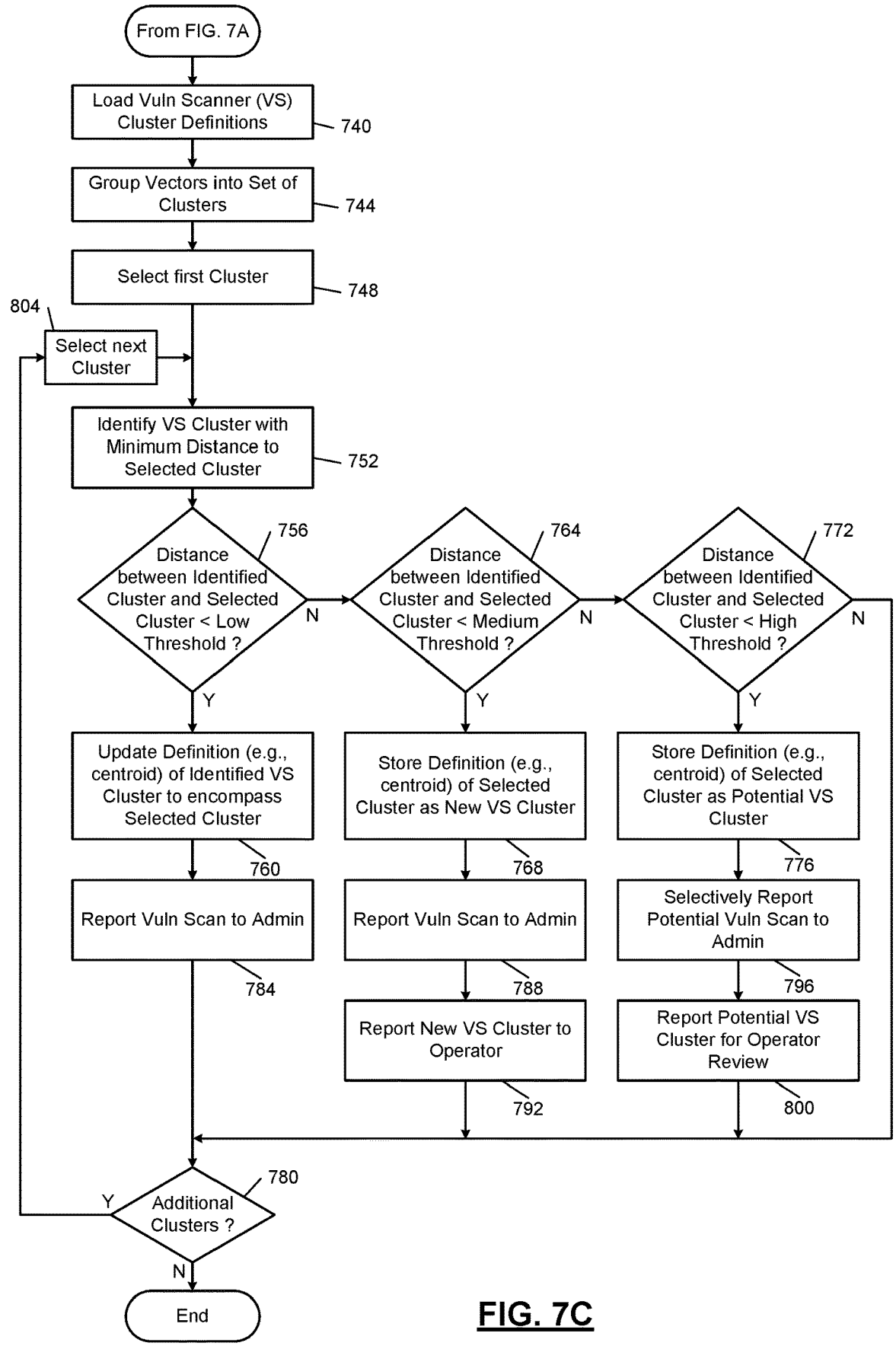

In FIGS. 7A-7C, an example control for evaluating unknown web service logs is presented. Control begins on a periodic schedule at 604. At 604, control obtains HTTP logs of web applications (apps). For example, these logs may be obtained from a single repository or from multiple distributed locations. At 608, control preprocesses the HTTP logs, such as described above with respect to the ingest module 304.

At 612, control selects the first web app whose logs were obtained. At 616, control parses the logs for the selected web app to identify a list of remote IP addresses that accessed the selected web app. At 620, control selects a first IP address from the IP list. The sorting of the IP list may be numerical or may simply be the order in which the IP addresses were encountered in the logs. At 624, control selects the first user agent string associated with the selected web app in the selected IP address. In combination, the selected user agent, the selected IP address, and the selected web app establish a server-client triplet. This pairing is then evaluated in FIG. 7B at 640.

At 640, control initializes a vector whose length is equal to the number of patterns of the dictionary and whose elements are all set to either binary zero or integer zero. At 644, control creates a chronological list of HTTP requests for the selected client-server triplet. At 648, control selects the first HTTP request from the chronological list.

At 652, control determines whether there are any proximate requests within a predetermined window of time following the selected request. If so, control transfers to 656. Otherwise, control transfers to 660. At 656, control selects the first pair of selected request and proximate request from among the proximate requests. At 664, control determines whether the selected pair is in the dictionary. If so, control transfers to 668; otherwise, control transfers to 672. Determining whether the selected pair is in the dictionary may be performed based on order or irrespective of order. If irrespective of order, the pair may be ordered according to a predetermined rule so that the order will match the order of any existing pair in the dictionary.

At 668, control increments the corresponding element in the vector. Because the elements begin at zero, the element in the vector indicates the number of times the pair (feature) appears in this client-server interaction. In various other implementations, the vector elements may be binary, in which case the corresponding element is simply set, such as to a binary 1. Each additional time that feature is encountered, the binary value is simply set once again. Control then continues at 672.

At 672, control determines whether there are additional proximate requests. If so, control transfers to 676; otherwise, control transfers to 660. At 676, control selects the next pair of selected request and proximate request and returns to 664. At 660, control determines whether the selected request is the last in the chronological list. If so, control transfers to 680; otherwise, control transfers to 684. At 684, control selects the next HTTP request and returns to 652. At 680, control stores the created vector for the selected client-server server triplet and returns to 700 in FIG. 7A.

In FIG. 7A at 700, control determines whether there are additional user agent strings associated with the selected IP address for the selected web app. If so, control transfers to 704; otherwise, control transfers to 708. At 704, control selects the next user agent string and transfers to 640 of FIG. 7B to process this next client-server triplet. At 708, control determines whether there are additional IP addresses in the IP list for the selected web app. If so, control transfers to 712; otherwise, control transfers to 716. At 712, control selects the next IP address from the IP list and continues at 624. At 716, control determines whether logs were ingested for additional web apps. If so, control transfers to 720; otherwise, control transfers to 740 in FIG. 7C. At 720, control selects the next web app and continues at 616.

At 740 in FIG. 7C, control loads vulnerability scanner cluster definitions. At 744, control groups vectors determined in FIG. 7B into a set of clusters, such as by using k-means clustering. At 748, control selects the first cluster of the set of clusters. At 752, control identifies the vulnerability scanner cluster having a minimum distance to the selected cluster. For example, the distance may be determined using cosine similarity between the centroids of the clusters.

At 756, control determines whether the distance between the identified cluster and the selected cluster is below a low threshold. If so, control transfers to 760; otherwise, control transfers to 764. At 764, control determines whether the distance between the identified cluster and the selected cluster is less than a medium threshold. If so, control transfers to 768; otherwise, control transfers to 772. At 772, control determines whether the distance between the identified cluster and the selected cluster is less than a high threshold. If so, control transfers to 776; otherwise, control transfers to 780.

The thresholds are described as low, medium, and high only relative to each other: the low threshold is simply defined as being less than the medium threshold, while the medium threshold is defined as being less than the high threshold. In other words, there is no subjective standard for whether a threshold is low, medium, or high.

At 760, control updates the definition of the identified vulnerability scanner cluster to encompass the selected cluster. Control continues at 784, where a vulnerability scan is reported to the administrator(s) of the web apps experiencing the identified vulnerability scanning activity. For example, the reporting may be made to the security center 244 of FIG. 4. Control then continues at 780.

At 768, control stores the definition of the selected cluster as a new vulnerability scanner cluster given its closeness to the existing vulnerability scanner cluster. The vulnerability scanning activity is reported to administrators of the affected web services at 788. Control continues at 792, where the addition of the new vulnerability scanner cluster is reported to the operator. In addition to awareness of new vulnerability scanner activity, this allows the operator to vet the new vulnerability scanner cluster and identify false positives. Control continues at 780.

At 776, control stores the definition of the selected cluster as a potential vulnerability scanner cluster. At 796, control selectively reports the potential vulnerability scanning activity to the administrator. Whether this potential vulnerability scanning is reported may be under control of the operator and also may be controlled by the administrator. For example, the administrator may want to turn off reports of potential vulnerability scanning to avoid false positives. Control continues at 800, where the potential vulnerability scanner cluster is reported to the operator for review and possible inclusion as a vulnerability scanner cluster for future analyses. Control continues at 780.

At 780, control determines whether there are additional clusters generated by 744. If so, control transfers to 804; otherwise, analysis has concluded and control ends. At 804, control selects the next cluster and returns to 752.

Figure 8:
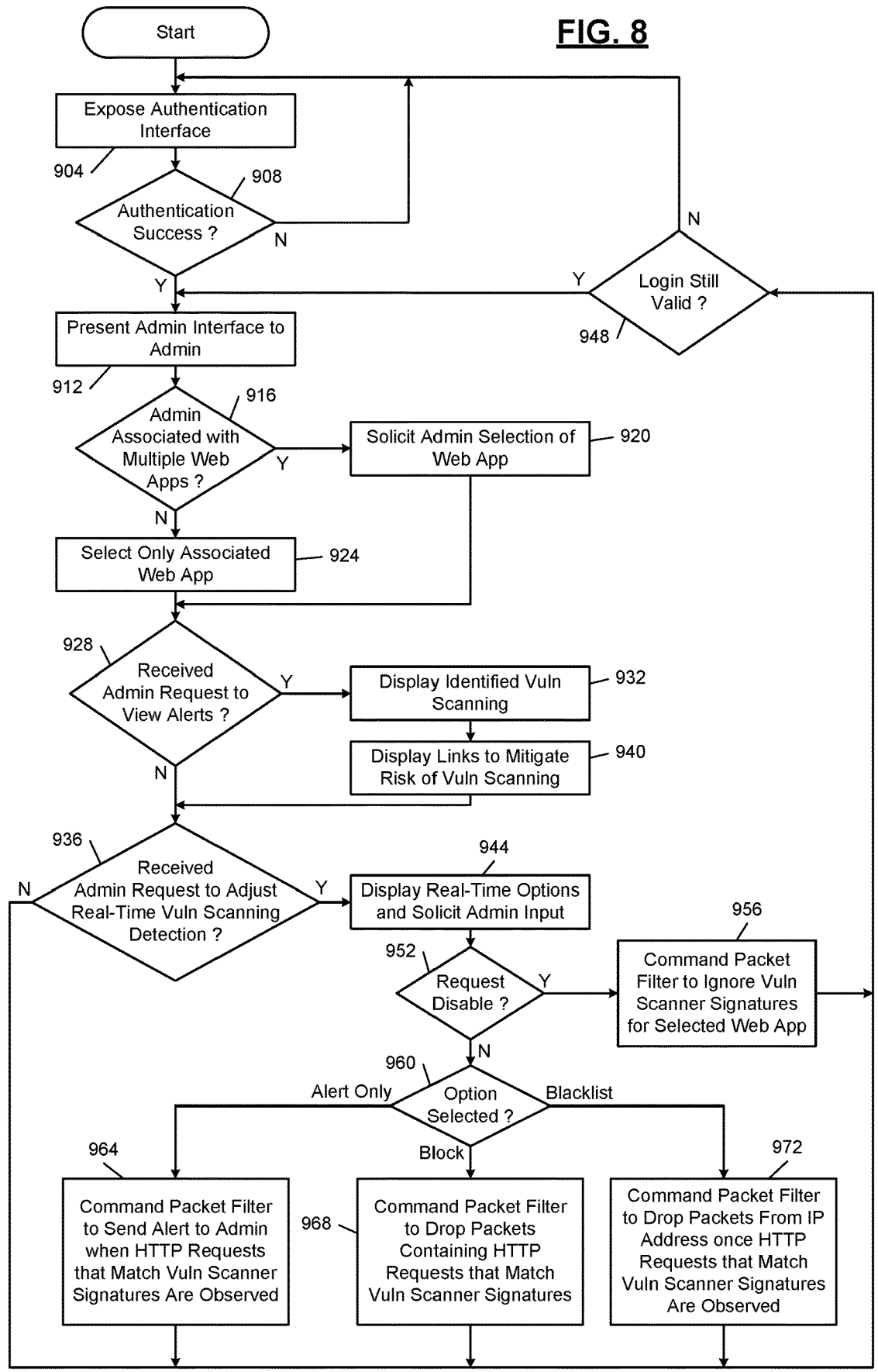
FIG. 8 is a flowchart of example operation of a security center for a distributed computing system implementing the principles of the present disclosure.

In FIG. 8, example operation of portions of a security center, such as the security center 244 of FIG. 4, are presented. Control begins at 904, where an authentication interface is exposed to administrators. For example, the authentication interface may take the form of a web-based login interface. Authentication may rely on a username and password, optionally supplemented by multifactor authentication, and may integrate with single sign-on solutions. At 908, if authentication has been successful, control transfers to 912; otherwise, control returns to 904.

At 912, control presents a graphical user interface to the administrator. At 916, control determines whether the administrator is associated with multiple web applications. If so, control transfers to 920; otherwise, control transfers to 924. At 920, control solicits administrator selection of the web app of interest. Control then continues at 928. At 924, control selects the only associated web app and continues at 928.

At 928, control determines whether an administrator request to view alerts has been received. If so, control transfers to 932; otherwise, control transfers to 936. At 932, control displays identified vulnerability scanning activity for the selected web application. Control continues at 940, where control displays links to resources and actions that can mitigate the risk of vulnerability scanning. For example, these links may point to download pages for updated modules or to administrator panels that allow for updating or changing of security settings. Control continues at 936.

At 936, control determines whether an administrator request to adjust real-time vulnerability scanning detection has been received. If so, control transfers to 944; otherwise, control transfers to 948. At 948, control determines whether the login is still valid for the administrator. If so, control transfers to 912; otherwise, control returns to 904. The login may remain valid for a predetermined period of time or until the administrator logs out or closes a browser window.

At 944, control displays real-time options and solicits administrator input. At 952, control determines whether the administrator has requested to disable real-time vulnerability scanning detection. If so, control transfers to 956; otherwise, control transfers to 960. At 956, control commands the packet filter associated with the selected web app to ignore vulnerability scanner signatures for the selected web app. Control then continues at 948.

At 960, control determines which option the administrator has selected. If the administrator selected an alert only option, control transfers to 964; if the administrator selected a block option control transfers to 968; and if the administrator selected a blacklist option, control transfers to 972. At 964, control commands the packet filter to send an alert to the administrator (such as by the security center 244) when HTTP requests that match vulnerability scanner signatures are observed. Control then continues at 948. At 968, control commands the packet filter to drop packets containing HTTP requests that match vulnerability scanner signatures. Control then continues at 948.

At 972, control commands the packet filter to drop packets from an IP address once HTTP requests that match vulnerability scanner signatures are observed. For example, this may cause the packet filter to drop packets from that IP address for a predetermined period of time, such as 10 minutes, one hour, or 24 hours. Control then continues at 948.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

The invention claimed is:

1. A system comprising:
   at least one processor; and
   a computer-readable medium having stored thereon computer-executable instructions that are structured such that, when executed by the at least one processor, the computer-executable instructions configure the system to perform the following:
   obtain a dictionary that contains definitions of a first set of clusters of vulnerability scanner activities, generated from a first set of web requests associated with a plurality of vulnerability scanners;
   receive data for a second set of web requests transmitted to a set of web services;
   identify a set of clients that transmitted the second set of web requests;
   generate a second set of feature vectors, wherein for each feature vector in the second set of feature vectors:
      the feature vector corresponds to one web service of the set of web services and to one client of the set of clients, and
      each element in the feature vector corresponds respectively to an entry in the dictionary;
   cluster the second set of feature vectors into a second set of clusters; and
   in response to determining a first distance between at least one cluster of the second set of clusters and at least one cluster of the first set of clusters being less than a first predetermined distance,
      (i) identify one web service of the set of web services that received web requests corresponding to feature vectors in the at least one cluster in the second set of clusters; and
      (ii) generate an alert for an administrator of the one web service of the set of web services, the alert indicating that at least one client of the set of clients that transmitted at least one web request of the second set of web requests is likely associated with one of the plurality of vulnerability scanners.

2. The system of claim 1 wherein the instructions include instructions that are executable to cause the system to further perform:
  obtain Hall the first set of web requests associated with the plurality of vulnerability scanners;
  identify patterns from the first set of web requests, wherein each of the patterns includes information from at least one web request of the first set of web requests;
  create the dictionary based on the identified patterns;
  generate a first set of feature vectors, wherein for each feature vector in the first set of feature vectors:
    the feature vector corresponds to one of the plurality of vulnerability scanners, and
    each element in the feature vector corresponds respectively to an entry in the dictionary; and
  cluster the first set of feature vectors into the first set of clusters.

3. The system of claim 2 wherein:
  the instructions include dividing the identified patterns into non-overlapping first and second subsets, wherein patterns in the first subset are more frequent in the first set of web requests than are patterns of the second subset; and
  the dictionary is created from the first subset exclusive of the second subset.

4. The system of claim 2 wherein:
  the first set of web requests are hypertext transfer protocol (HTTP) requests;
  each of the HTTP requests is associated with an Internet Protocol (IP) address, a user agent string, and a path; and
  each of the identified patterns includes a uniform resource identifier (URI) from each of at least one of the HTTP requests.

5. The system of claim 2 wherein, for each pattern of the identified patterns:
  the pattern includes a uniform resource identifier (URI) from a respective plurality of the first set of web requests; and
  a time interval between an earliest one of the respective plurality of the first set of web requests and a latest one of the respective plurality of the first set of web requests is less than a predetermined time interval.

6. The system of claim 1 wherein the instructions include instructions that are executable to configure the system to further perform:
  in response to the first distance being greater than the first predetermined distance but less than a second predetermined distance, (i) add the at least one cluster of the second set of clusters into the first set of clusters; and (ii) generate an alert for the administrator.

7. The system of claim 6 wherein the instructions include instructions that are executable to configure the system to further perform:
  in response to the first distance being greater than the second predetermined distance but less than a third predetermined distance, (i) proposing addition of the at least one cluster of the second set of clusters to the first set of clusters; and (ii) selectively generating an alert for the administrator; and
  in response to analyst input that the selected cluster represents vulnerability scanning activity, adding the selected cluster to the second set of clusters.

8. The system of claim 6 wherein the instructions include instructions that are executable to configure the system to further perform:
  in response to the first distance being less than the first predetermined distance, selectively update the one cluster of the first set of clusters to encompass the selected cluster.

9. The system of claim 1 wherein the first distance is determined based on cosine similarity between a centroid of the at least one cluster of the second set of clusters and a centroid of the at least one cluster of the first set of clusters.

10. The system of claim 1 wherein the one cluster of the first set of clusters is chosen such that the first distance is less than or equal to respective distances between the at least one cluster of the second set of clusters and remaining ones of the first set of clusters.

11. The system of claim 1 wherein:
  the second set of web requests are hypertext transfer protocol (HTTP) requests;
  each of the HTTP requests is associated with an Internet Protocol (IP) address, a user agent string, and a path; and
  each of the set of clients is associated with a unique combination of IP address and user agent string.

12. The system of claim 1 wherein the instructions include instructions that are executable to configure the system to further perform, in response to a request from the administrator, send a command to a packet filter to transmit an alert when a packet stream targeted at the one web service of the set of web services matches a signature that is based on the first set of clusters.

13. The system of claim 12 wherein the instructions include instructions that are executable to configure the system to further perform, in response to a request from the administrator, send a command to the packet filter to temporarily blacklist a sender when the packet stream matches the signature.

14. A method comprising:
  obtaining a dictionary that contains definitions of a first set of clusters of vulnerability scanner activities, generated from a first set of web requests associated with a plurality of vulnerability scanners;
  receiving data for a second set of web requests transmitted to a set of web services;
  identifying a set of clients that transmitted the second set of web requests;
  generating a second set of feature vectors, wherein for each feature vector in the set of feature vectors:
    the feature vector corresponds to one web service of the set of web services and to one client of the set of clients, and
    each element in the feature vector corresponds respectively to an entry in the dictionary;
  clustering the second set of feature vectors into a second set of clusters; and
  in response to determining a first distance between a at least one cluster of the second set of clusters and at least one cluster of the first set of clusters being less than a first predetermined distance,
    (i) identifying one web service of the set of web services that received web requests corresponding to feature vectors in the at least one cluster in the second set of clusters; and
    (ii) generating a scanning alert for an administrator of the one web service of the set of web services, the alert indicating that at least one client of the set of clients that transmitted at least one web request of the second set of web requests is likely associated with one of the plurality of vulnerability scanners.

15. The method of claim 14 further comprising:
obtaining Hall the first set of web requests associated with the plurality of vulnerability scanners;
identifying patterns from the first set of web requests, wherein each of the patterns includes information from at least one web request of the first set of web requests;
creating the dictionary based on the identified patterns;
generating a first set of feature vectors, wherein for each feature vector in the first set of feature vectors:
the feature vector corresponds to one of the plurality of vulnerability scanners, and
each element in the feature vector corresponds respectively to an entry in the dictionary; and
clustering the first set of feature vectors into the first set of clusters.

16. The method of claim 15 further comprising:
dividing the identified patterns into non-overlapping first and second subsets, wherein patterns in the first subset are more frequent in the first set of web requests than are patterns of the second subset,
wherein the dictionary is created from the first subset exclusive of the second subset.

17. The method of claim 15 wherein:
the first set of web requests are hypertext transfer protocol (HTTP) requests;
the second set of web requests are HTTP requests;
each of the HTTP requests is associated with an Internet Protocol (IP) address, a user agent string, and a path;
each of the identified patterns includes a uniform resource identifier (URI) from each of at least one of the HTTP requests; and
each of the set of clients is associated with a unique combination of IP address and user agent string.

18. The method of claim 15 wherein, for each pattern of the identified patterns:
the pattern includes a uniform resource identifier (URI) from a respective plurality of the first set of web requests; and
a time interval between an earliest one of the respective plurality of the first set of web requests and a latest one of the respective plurality of the first set of web requests is less than a predetermined time interval.

19. The method of claim 14 wherein:
the first distance is determined based on cosine similarity between a centroid of the at least one cluster of the second set of clusters and a centroid of the one cluster of the first set of clusters; and
the method further comprises:
in response to the first distance being less than the first predetermined distance, selectively updating the one cluster of the first set of clusters to encompass the selected cluster;
in response to the first distance being greater than the first predetermined distance but less than a second predetermined distance, (i) adding the selected cluster to the second set of clusters and (ii) generating a scanning alert for the administrator; and
in response to the first distance being greater than the second predetermined distance but less than a third predetermined distance, (i) proposing addition of the selected cluster to the second set of clusters and (ii) selectively generating a scanning alert for the administrator, and (iii) in response to analyst input that the selected cluster represents vulnerability scanning activity, adding the selected cluster to the second set of clusters.

20. A computer-readable hardware storage device having stored thereon computer-executable instructions, the instructions comprising instructions that are executable to configure a computer system to perform at least the following:
obtain a dictionary that contains definitions of a first set of clusters of vulnerability scanner activities, generated from a first set of web requests associated with a plurality of vulnerability scanners;
receive data for a second set of web requests transmitted to a set of web services;
identify a set of clients that transmitted the second set of web requests;
generate a set of feature vectors, wherein for each feature vector in the set of feature vectors:
the feature vector corresponds to one web service of the set of web services and to one client of the set of clients, and
each element in the feature vector corresponds respectively to an entry in the dictionary;
cluster the set of feature vectors into a second set of clusters; and
in response to determining a first distance between at least one cluster of the second set of clusters and at least one cluster of the first set of clusters being less than a first predetermined distance,
(i) identify one web service of the set of web services that received web requests corresponding to feature vectors in the at least one cluster in the second set of clusters; and
(ii) generate a vulnerability scanning alert for an administrator of the one web service of the set of web services, the alert indicating that at least one client of the set of clients that transmitted at least one web request of the second set of web requests is likely associated with one of the plurality of vulnerability scanners.

* * * * *